United States Patent
Digges

[15] 3,677,360
[45] July 18, 1972

[54] HEAT REMOVAL SYSTEM FOR BRAKES

[72] Inventor: Kennerly H. Digges, Kettering, Ohio

[73] Assignee: The United States of America as represented by the Secretary of the Air Force

[22] Filed: Feb. 23, 1971

[21] Appl. No.: 118,011

[52] U.S. Cl. ................180/124, 180/116, 188/264 CC
[51] Int. Cl. .................................................B60v 1/00
[58] Field of Search ..............180/124, 116; 188/26 CC

[56] References Cited

UNITED STATES PATENTS

| | | | |
|---|---|---|---|
| 3,481,439 | 12/1969 | Finken | 188/264 CC X |
| 3,524,517 | 8/1970 | La Fleur | 180/124 |
| 3,592,297 | 7/1971 | Leffert | 188/264 CC X |
| 3,595,336 | 9/1971 | Perez | 180/124 X |
| 3,610,377 | 10/1971 | Leffert | 188/264 CC |

*Primary Examiner*—A. Harry Levy
*Attorney*—Harry A. Herbert, Jr. and Richard J. Killoren

[57] ABSTRACT

A braking system for an air cushion landing system having inflatable braking pillows with a fluid provided near the wall adjacent the braking surface which, when evaporated by heat generated at the braking surface, rises and contacts a condenser surface which transfers heat to air passing through the trunk of the air cushion landing system.

6 Claims, 3 Drawing Figures

Patented July 18, 1972 3,677,360
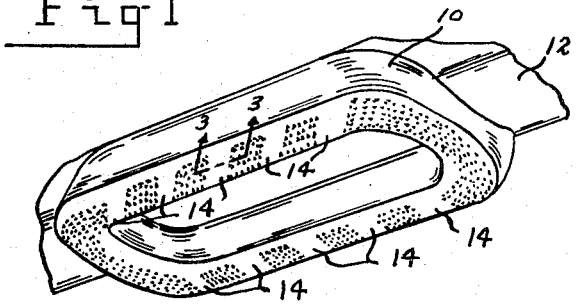
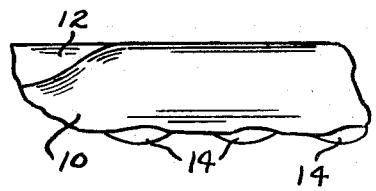
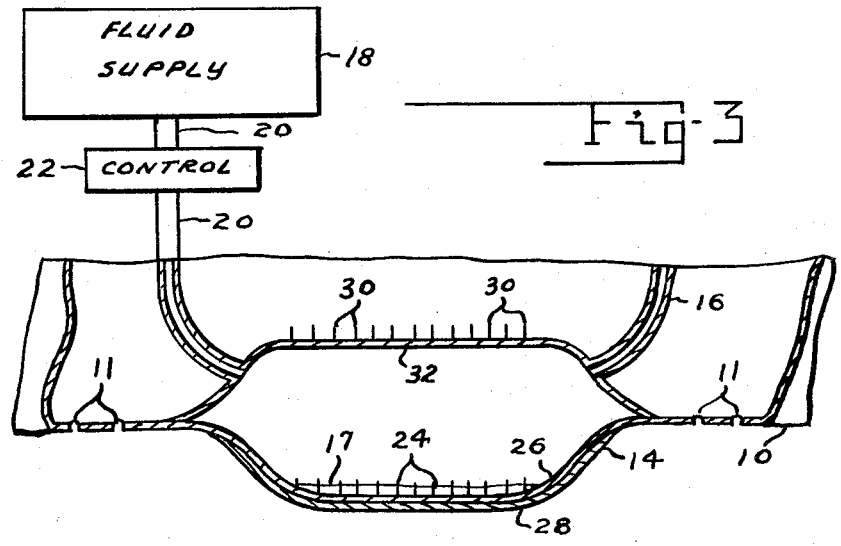
INVENTOR.
KENNERLY H. DIGGES
BY *Henry A. Herbert Jr.*
ATTORNEY
*Richard J. Killoe*
AGENT

HEAT REMOVAL SYSTEM FOR BRAKES

BACKGROUND OF THE INVENTION

Air cushion landing systems have large doughnut-like structures, on the bottom of the fuselage, called trunks. The trunks form the ducting for the air cushion.

A braking apparatus for such a system is described in the patent to LaFleur, No. 3,524,417. A major problem with such a braking system is to provide a rapid transfer of heat from the brake surface. With the present system, thermal energy generated to brake friction is dissipated slowly to the environment.

SUMMARY OF THE INVENTION

According to this invention, use is made of the large quantity of air which flows through the trunks. In the present system, the air in the brake pillows is virtually static so that they form excellent insulators, which inhibit the flow of heat through the pillow to the air flowing through the trunks. The heat pump principle is used to transfer heat across the space in the braking pillows. A liquid adjacent the braking surface is evaporated and the liquid is then condensed at the wall adjacent the air flow within the trunk. The condensed liquid then flows back to the wall adjacent the braking surface.

IN THE DRAWING

FIG. 1 shows an air cushion landing system such as used on aircraft or ground effect machines.

FIG. 2 is an enlarged cutaway side view of trunk and inflated braking pillows for the device of FIG. 1.

FIG. 3 is a sectional view of a braking pillow for the device of FIG. 1 along the line 3—3.

Reference is now made to FIG. 1 of the drawing, wherein an inflated air cushion trunk 10 is shown mounted on the bottom of an aircraft fuselage 12. The trunk 10 has conventional bleedoff apertures 11. Braking pillows 14, shown in their uninflated condition in FIG. 1, are shown inflated in FIG. 2. The pillows 14 are inflated from an air supply conduit 16 in the same manner as in the LaFleur device. A liquid 17, such as a water-ethylene glycol mixture, is supplied as needed from a supply shown schematically at 18 through a conduit 20 and control valve 22. In one manner of operation, a predetermined quantity of liquid would be supplied to the pillow, by operation of the control valve 22 by the pilot, after the brake pillows have been inflated. An automatic system could be provided for maintaining a predetermined liquid level within the pillows for some applications. The valve 22 may be a solenoid valve operated by a signal applied to electrical leads thereto, such as when the pilot closes a switch. Baffles 24 may be molded on the wall 26 adjacent brake pad 28 to keep the liquid in contact with the wall during deceleration of the vehicle. Radiating elements 30 within trunk 10, of a material such as aluminum, may be secured to the liquid condenser wall 32 in a conventional manner, such as with an epoxy cement.

To improve heat transfer to the radiating elements, the wall 32 can be formed of a rubber impregnated metal mesh to which radiating elements 30 are attached.

In the operation of the device the system functions in the same manner as the device of LaFleur to provide braking. The thermal energy generated at the friction surface of brake pads 28 is conducted through the pillow wall 26 to evaporate liquid 17. The vapor rises to the top of braking pillows 14 and is condensed by the surface of condenser walls 32, which are cooled by air flow within trunk 10. The condensed liquid falls back to the wall 26. Conventional wicking may be provided adjacent the evaporator wall and side walls of braking pillows to return the condensed liquid to the wall 26. The baffles 24 hold the liquid in contact with wall 26 during deceleration.

The heat transfer system of the invention can be used with any braking system wherein heat must be transferred across a pressurized air space, for example, such as the device described in the patent application of David J. Perez, Ser. No. 859,467 filed Sept. 19, 1969, and since issued as U.S. Pat. No. 3,595,336 or in expander tube braking system such as used on the "C-124" aircraft.

While a water ethylene glycol mixture liquid has been described, other liquids could be used. For example, water alone, and in some applications, a refrigerant might be used.

There is thus provided an improved heat transfer system for use in braking systems wherein heat must be transferred across a gas filled space.

I claim:

1. In combination with a vehicle braking system having an expandable tubular member with means to supply air under pressure to said tubular member to engage the braking surfaces to thereby provide braking for the vehicle; a system for increasing the rate of removal of thermal energy from the braking surface of the braking system, comprising: means for supplying a vaporizable liquid to the expandable tubular member whereby the heat energy generated at the friction surface evaporates the liquid so that the vapor rises in the tubular member toward a cooling wall with heat radiating elements thereon whereby the liquid is condensed so that it may be returned to the bottom of the tubular member.

2. In combination with an air cushion support system for a vehicle having an inflatable bag like trunk device carried by said vehicle with means to supply a flow of air through the inflatable trunk device and braking pillows on the trunk device with means to increase the pressure in the braking pillows above the pressure in the trunk device to thereby provide braking for the vehicle; a system for increasing the rate of removal of thermal energy from the braking surface of the braking pillows, comprising: means for supplying a vaporizable liquid to the pillows whereby the heat energy generated at the friction surface evaporates the liquid so that the vapor rises in the pillows; means including the air flow through said trunk for cooling the top wall of the pillows whereby the liquid is condensed so that it may be returned to the bottom of said pillows.

3. The device as recited in claim 2 wherein said means for cooling the top wall of the pillows include radiating elements connected to the top wall and extending into the air flow.

4. The device as recited in claim 2 including baffles connected to the wall of the pillows adjacent the friction surface whereby the liquid is held in contact with the pillow wall during deceleration.

5. The device as recited in claim 4 wherein said means for cooling the top wall of the pillows include radiating elements connected to the top wall and extending into the air flow.

6. The device as recited in claim 5 wherein said vaporizable liquid is a water-ethelene glycol mixture.

* * * * *